Dec. 12, 1939.  B. H. BUNN  2,182,959
TYING MACHINE
Filed July 16, 1937   3 Sheets-Sheet 1
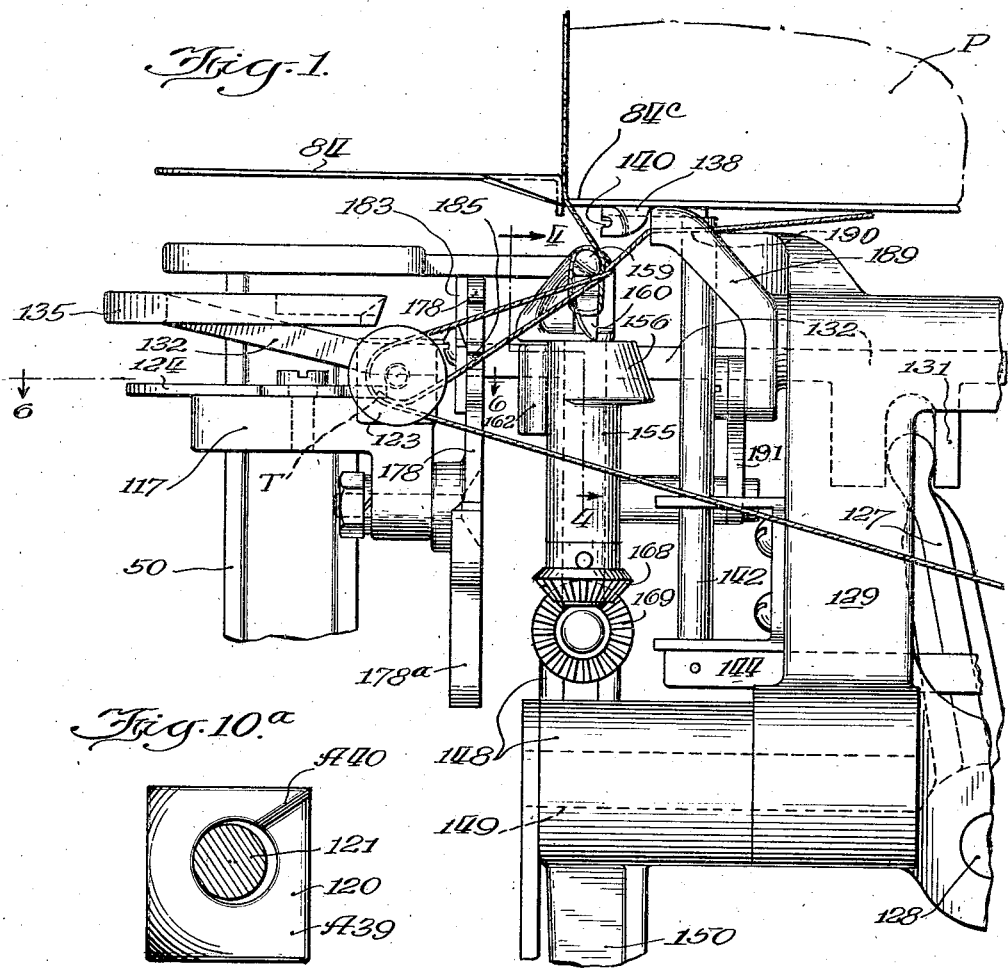
Fig. 1.
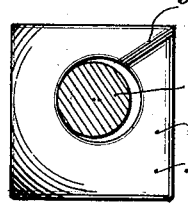
Fig. 10.ª
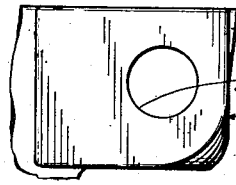
Fig. 10ᵇ
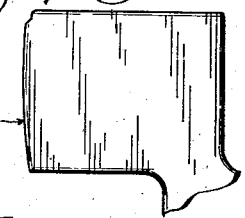
Fig. 10ᶜ
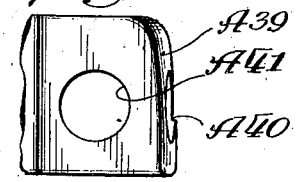
Fig. 10ᵈ
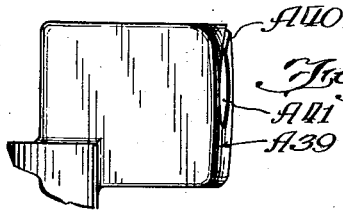
Fig. 10ᵉ
Inventor:
Benjamin H. Bunn
By Williams, Bradbury, McCaleb & Hinkle
Attys.

Dec. 12, 1939.  B. H. BUNN  2,182,959
TYING MACHINE
Filed July 16, 1937  3 Sheets-Sheet 2
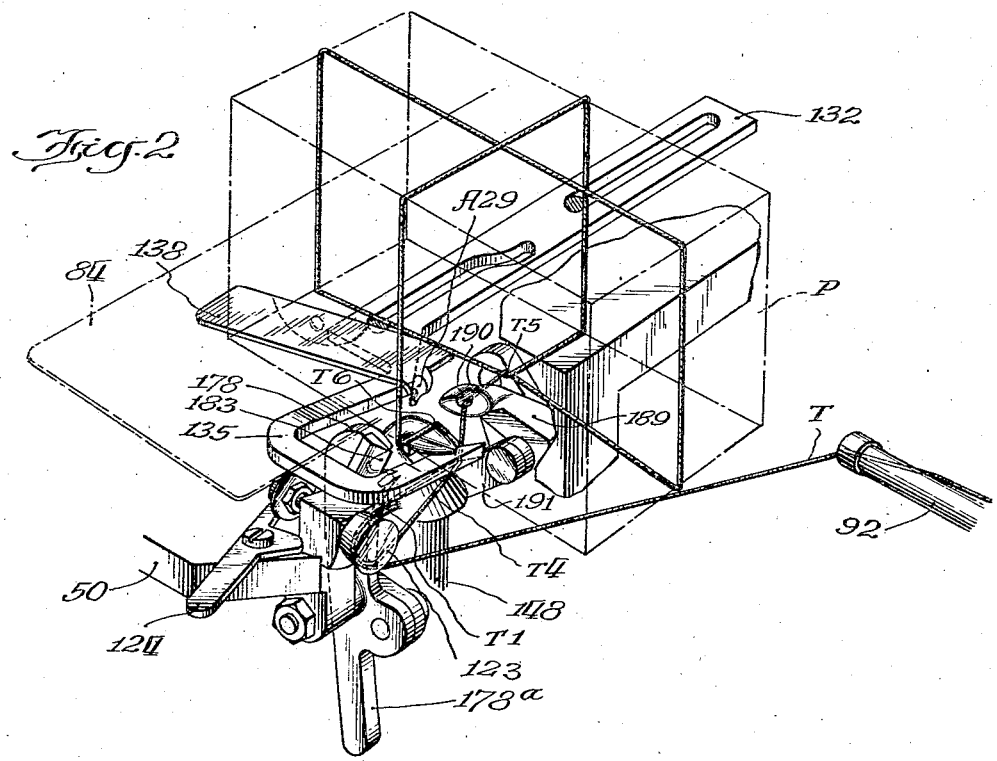
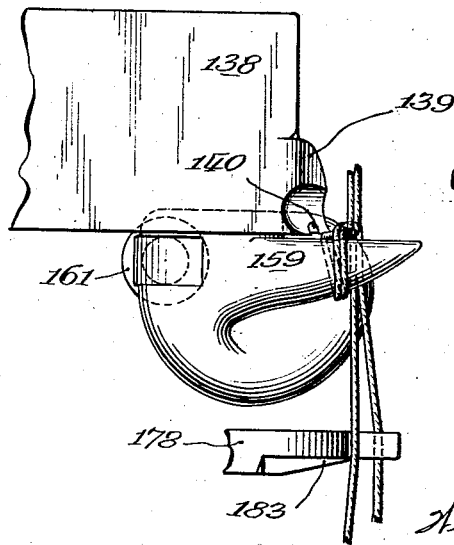
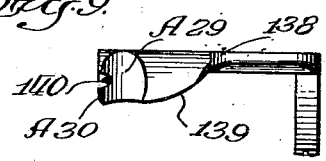
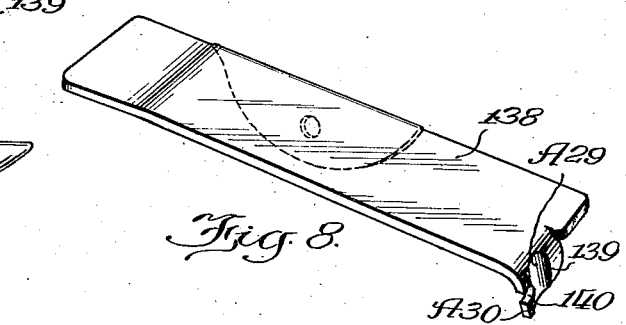
Inventor:
Benjamin H. Bunn
By Williams, Bradbury, McCaleb & Hinkle
Attys.

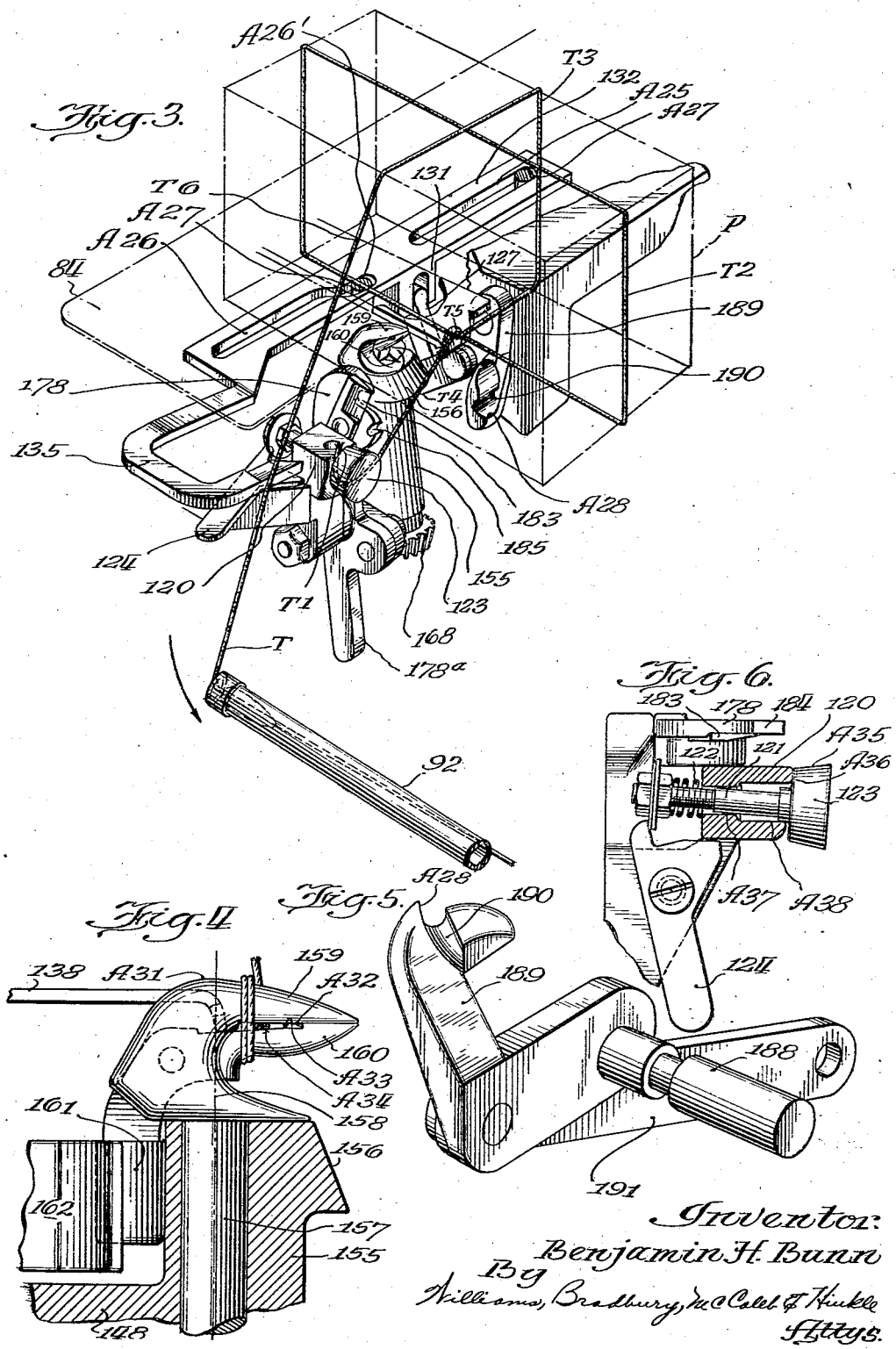

Patented Dec. 12, 1939

2,182,959

UNITED STATES PATENT OFFICE 2,182,959

TYING MACHINE

Benjamin H. Bunn, Chicago, Ill., assignor to B. H. Bunn Company, Chicago, Ill., a corporation of Illinois Application July 16, 1937, Serial No. 153,940

11 Claims. (Cl. 289—2)

My invention relates to tying machines and especially to that type of tying machine which puts one or more wraps of twine about a package and then ties a knot in the ends of the twine.

In general my present invention is concerned with certain improvements in the details of the tying machines shown in my prior Patents No. 1,606,290 of November 9, 1926, and No. 1,994,453 of March 19, 1935. Among these improvements are the following:

(a) Better insurance against the knotted portion of the twine slipping past the stripper as the knot loop is stripped from the beak or knotting head on which it has been formed;

(b) Better adaptation of the jaws of the beak to handle varying sizes of twine in pulling out the loop as the knot is formed, and the disposition of the double reaches of twine between the jaws to facilitate a more advantageous and reliable engagement by the stripper; and (c) An improved conformation for the crown of the upper jaw of the knotter beak which is calculated to help the twine passing thereover to work itself toward the point of the jaws.

The foregoing, together with further objects, features and advantages of my invention, are set forth in the following description of a specific embodiment thereof and illustrated in the accompanying drawings. The description and drawings are intended primarily to disclose my present improvements over the disclosures of my previously mentioned prior patents, and the reader is referred to those prior patents for a more complete disclosure of the nature and operation of the parts shown and for the mechanism by which the parts shown are mounted and operated in properly timed sequence. Also, for a more convenient reference back to my prior patents, I have here employed the same reference characters as are used in the prior patents to identify the same, or corresponding, parts. To avoid confusion because of this use of the reference characters in accordance with my prior patents, I have in this application employed the prefix "A" for all new reference characters added herein. Thus, reference characters carrying the prefix "A" do not necessarily correspond with parts identified by the same number in my prior patents.

My present improvements are here shown as incorporated in the disclosure of my Patent No. 1,994,453 rather than the disclosure of my Patent No. 1,606,290. The disclosure of my Patent No. 1,994,453 differs from that of my Patent No. 1,606,290 chiefly in the elimination of the package positioning guides and package clamp, and in the modification of the wrapping arm drive mechanism whereby the wrapping arm puts one wrap of twine about the package and then pauses until the operator actuates a foot pedal to resume the wrapping whereby the wrapping arm forms a second wrap, the end of which is caught in the twine catcher. Then the knotting operation is performed in accordance with my Patent No. 1,606,290. The purpose of the pause between the first and second wrappings is to permit the operator to turn the package through 90° so that one wrap is longitudinal and one wrap is transverse. If desired, however, the wraps may be parallel and together, in which case the package is not turned during the pause. I contemplate, as set forth in my Patent No. 1,994,453, that provision may be made for more than two wraps.

Many aspects of my present invention are not confined to a multi-wrap tying machine, but some of them are particularly advantageous where a plurality of wraps is employed and therefore I have here illustrated an embodiment of my invention where two wraps are employed, one longitudinally of the package and one transversely thereof.

In the drawings:

Fig. 1 is an elevation of the knotting mechanism and associated parts corresponding with Fig. 5 of my Patent No. 1,994,453 (and in turn corresponding with Fig. 8 of my Patent No. 1,606,290) except that less of the operating mechanism for the knotter is shown, and except that the parts are shown in the position they occupy at a later stage in the formation of the knot—a stage immediately before that of Fig. 16 of my Patent No. 1,606,290.

Fig. 2 is a somewhat diagrammatic perspective view showing in phantom the package being wrapped and showing the two wraps of twine in place on the phantom package and with the parts in the position or stage immediately following that of Fig. 1. In this figure the parts are viewed from the same side as in Fig. 1 but partly from above and from the left.

Fig. 3 is a perspective view similar to Fig. 2 but at an earlier stage in the cycle of operation, namely, as the third side of the second wrap is being formed and just before the twine of the third wrap is caught in the twine catcher to anchor the other end as well during the tying operation. In this figure, as well as in Fig. 2, many of the parts shown in Fig. 1 are omitted for clarity or indicated only in broken lines.

Fig. 4 is an elevation of the knotter, partly in section, taken on the line 4—4 of Fig. 1 and showing the knotter in the position of Fig. 2.

Fig. 5 is a perspective view of the tip-up arm, or twine lifting lever, corresponding to Fig. 34 of my Patent No. 1,606,290.

Fig. 6 is a plan section taken on the line 6—6 of Fig. 1 showing the twine catcher and its mounting but with the twine removed.

Fig. 7 is a plan view of the knotter head as it is being moved backwardly and the knot stripped from its beak by the strippers and showing in plan the parts of Fig. 4 at a later stage.

Fig. 8 is a perspective view of the horizontally pivoted stripper which engages the right (Fig. 1) side of the knotter beak.

Fig. 9 is a front end elevation of the stripper of Fig. 8, and

Figs. 10a to 10e, inclusive, are views of the various sides of the twine catcher block as viewed from the front (Fig. 1), the top, the right (Fig. 1) side, the bottom, and the left (Fig. 1) side of the block. The purpose of this set of figures is to show the contour of the front face of the block against which the back, or shoulder, of the twine catcher button cooperates in holding the twine.

The package P to be wrapped is here shown as of rectangular box-like form but it may be of other form or in the nature of a bundle or of a stack of sheets, such as labels or the like, whether sheet wrapped or not. The package is set upon a table 84 suitably mounted on the general frame 50 of the machine, with one side of the package against the shoulder formed by the normal downward flexing of the forward edge of the right (Fig. 1) hand portion 84c of the table. The end T1 of the twine T is caught between the head or button 123 and the block 120 of the twine catcher (Fig. 3). By its first clockwise rotation, as indicated by the arrow in Fig. 3, the wrapping arm 92 has passed around all four sides of the package P while the package was disposed at 90° to the position shown in Fig. 3. Thereby the first wrap T2 has been laid longitudinally about the package. Following the first wrap T2, and as set forth in detail in my Patent No. 1,994,453, rotation of the wrapping arm 92 is suspended while the operator has turned the package through 90° to the position of Fig. 3 and until the operator has pressed a control pedal to resume the wrapping operation. Thereupon the wrapping arm 92 commences a second rotation which forms the second wrap T3. In the position of Fig. 3 the twine may be traced as follows:

The end T1 is caught in the twine catcher between the head 123 and the front face of the block 120. From there a reach of twine T4 extends to the concatenation T5 and thence longitudinally around the package as the first wrap T2, back to the concatenation T5 and then across one-half of the bottom, upwardly along the adjacent side, and across the top to form part of the second wrap T3. In Fig. 3 the wrapping arm 92 has completed about three-quarters of its second wrapping revolution and the twine extends directly from the top reach of the second wrap T3 obliquely downwardly to the tip guide of the wrapping arm 92, as indicated at T6.

The twine catcher is disposed substantially in the vertical plane in which the tip of the wrapping arm 92 rotates. For this reason, after the wrapping arm 92 has rotated a few degrees beyond the position of Fig. 3, the reach T6 of the twine will engage the twine catcher and be caught in the space between the rear face of the head 123 and the front face of the block 120.

At this point I wish to describe the mechanism which prevents the reach of twine extending from the package to the wrapping arm from being caught by the twine catcher during the first wrap but which insures its being caught in the second wrap, as just described.

A plate 132 is mounted on the main frame of the machine for horizontal reciprocation a spaced distance below the table 84. That portion of the plate 132 which underlies the table is guided by a pair of tandem slots A25 and A26 into which extend studs or pins A27 fixedly carried by the main frame. This provides a generally rectilinear path for reciprocatory movement of the plate 132. One end of the plate 132 carries a U-shaped projection 135. The inner end A26' of the slot A26 is offset slightly from the center line of the main body of the slot A26 and of the slot A27. Thus the reciprocation of the plate 132 and consequently of the free end of the U-shaped projection 135 is strictly rectilinear, unless and until the plate is slid so that the pins A27 come to the far end of their slots. In that case one of the pins enters the offset slot portion A26' and moves the free end of the projection 135 laterally away from the reader.

Reciprocation of the plate 132 is effected by one arm of a bell crank 127 pivoted at 128 to a bracket carried by the machine frame. The free end of the arm engages a bifurcated or slotted boss 131 which depends from the plate 132. At the proper times in the cycle of the machine, the cam which rocks the bell crank 127 causes the plate 132 to be reciprocated to its several positions.

When the wrapping arm passes its position of Fig. 3, but on the first wrap, the bell crank holds the plate 132 in a position where the pin A27 is in the main body of the slot A26 but near the inner end thereof. In that position the free end of the projection 135 is nearer the reader and its outer edge serves as a guide to carry the oblique reach of twine past the twine catcher 123. But when the wrapping arm 92 reaches the position of Fig. 3 on its second wrap, the bell crank 127 has shifted the plate 132 so that the pins A27 come at the inner ends of their slots, including the offset portion A26'. This produces a lateral shifting about the rearward pin A27 so that the outer face of the free end of the projection 135 is offset from the plane of the twine catcher 123 and permits the oblique reach of twine to be engaged thereby. Continued movement of the wrapping arm to the completion of the second wrap, as shown in Figs. 1 and 2, leaves the final reach of twine engaged by the twine catcher along with the initial end T1.

This lateral shifting of the projection 135 for better insuring the passing or engagement of the twine catcher by the twine during the wrapping operations, is one of the features of my present invention. According to my two earlier patents mentioned, the plate 132 had only a simple rectilinear movement, and the twine was caused to engage the twine catcher 123 in the last wrap—the wrap which immediately precedes the tying—by merely withdrawing the free end of the extension 135 by the rectilinear movement of the plate 132, leaving a gap or space between the free end thereof and the twine catcher into which the oblique reach of twine would snap under tension. This was because the edge face of the extension 135 was in a plane slightly toward the reader from the plane of the twine catcher 123. By my present invention that gap is still provided, but in addition the offset end of the slot A26 causes a lateral shifting away from the reader as the oblique reach of twine passes toward the twine catcher in the last wrap. The edge face of the extension 135 is thereby and at that time shifted into the plane of the abutment of the twine catcher button with the block 120, and the twine is not required to snap under its tension inwardly to that plane, as was formerly required. Previously there would occasionally be a momentary impairment of the tension necessary to cause that snapping back to the proper plane for engagement by the twine catcher and the final wrap would fail to catch.

After the oblique reach of twine T6 has thus been caught by the twine catcher 123 in the last wrap, and the wrapping arm 92 has been brought to rest in its normal position of Fig. 2, the slide is moved to the right from the position shown in Fig. 3. As the pin A27 slides out of the offset portion A26' into the main body of the slot A26, the free end of the U-shaped projection 135 is shifted toward the reader to its normal plane, and it is then brought to the right so that the V-shaped end edge thereof engages the reach of twine T6 and also the first reach of twine T4 and carries them beneath the beak of the knotter head. That is the position shown in Fig. 12 of my Patent 1,606,290. The knotter head is carried on the upper end of a knotter shaft 157 (Fig. 4) and comprises a member 158 carrying integrally therewith an upper jaw 159 with a lower jaw 160 pivotally mounted on the member 158 to cooperate with the upper jaw. The lower jaw 160 is bell crank in form, and its lower offset arm carries a roller 161 which engages an annular cam face 156 provided at the upper end of the boss 155 in which the knotter shaft 157 is journaled. The lower end of the shaft 157 carries a pair of bevel gears 168 and 169 (Fig. 1) by which the knotter head is rotated at the proper time. The knotter shaft journaling boss 155 is carried at the upper end of a knotter bracketing member 148 which is pivotally mounted on a transverse pin 149 on a bracket 129 depending from the main frame. The lower end of the member 148 comprises an arm 150, at the bottom of which is a roller (not shown) engaged by a cam for rocking the entire member 148 about the shaft 149 to pull the knotter head rearwardly or push it forwardly as required. The reader is referred to my Patent 1,606,290 for further details of the mounting and operating mechanism for the knotter bracketing element 148.

In the position of Fig. 3, the knotter head is in its normal rearward position behind the plane of the wrap. After the last wrap of twine is caught in the twine catcher 123 and the plate 132 starts to slide to the right to the position of Fig. 2, the bracketing element 148 is rocked to bring the knotter head forwardly with its beak projecting through the plane of the last wrap. Thus by the time the plate 132 reaches its rightmost position, the free end of the projection 135 is beneath the beak of the knotter.

The sliding plate 132, as just described, brings the two reaches T4 and T6 of the twine to the right of the knotter beak, as shown in Fig. 2.

The tip-up lever 189 now engages the first reach of twine T4 and lifts it upwardly so that a portion of that reach will lie along the right-hand side of the knotter beak, so that when the knotter beak turns counterclockwise both reaches of twine will be wrapped about the beak. The tip-up lever 189, as shown in Fig. 5, carries a shaft 188 by which it is conveniently journaled on a portion of the main frame. The rocking of the lever is effected by link 191. One end of the link 191 is pivoted to the lever 189 and the other end to a pin (not shown) carried by the knotter bracketing frame 148. The reader is referred to my prior Patent 1,606,290 for further details of the operating mechanism for the tip-up lever 189. Suffice it to say that the link 191 serves to swing the lever 189 upwardly when the knotter beak is rocked forwardly about the pivoting pin 149 for the bracketing frame 148.

The tip-up lever 189 carries a transverse slot 190 which engages the reach of twine T4 and moves it upwardly to the position of Fig. 1 (although in the position of Fig. 1 the knotter head has rotated through a complete revolution to wrap the two reaches of twine about the beak). A comparison of Fig. 5 with Fig. 34 of my prior Patent 1,606,290 will best show the improvement I have made in the tip-up lever 189. Previously the slot 190 was so formed that the upper and lower walls of the slot were of equal depth and the tension of the reach of twine was relied upon to cause the twine to snap into the slot 190 in order that it be properly engaged. By my present invention I build up the height of the lower wall of the slot 190, as indicated at A28, so that it projects outwardly beyond the margin of the upper wall. In this way the reach of twine T4 is more positively engaged by the projecting portion A28 at the lower wall of the slot 190 instead of relying wholly on the tension of the reach of twine to snap it into the slot 190. This constitutes another feature of the present invention.

I have now described the cycle of operation and structure involved up to the position of Fig. 2, which shows the reach of twine T4 pulled upwardly along the right side of the knotter beak as the result of the lifting action of the tip-up lever 189. The next step is the rotation of the knotter head. Means for effecting the rotation, beyond the bevel gears 168 and 169, is not here illustrated and I refer the reader to my prior Patent 1,606,290 for further disclosure.

The knotter head rotates counterclockwise, when viewed from above. As the knotter head starts to rotate from the position shown in Fig. 2, the reaches of twine T6 and T4 are engaged by the advancing side of the beak. By the time the knotter has made half of its revolution—that is, by the time its beak points rearwardly—the reaches of twine T4 and T6 are wrapped side by side a full turn about the knotter beak. As the knotter head rotates from its half revolution position to its three-quarter revolution position, the roller 161 on the lower jaw 160 of the knotter beak rides up onto the protruding or eccentric portion of the cam surface 156, causing the jaws of the beak to open and receive the two substantially parallel reaches of twine. After this, and as the knotter head reaches the end of its full revolution, the roller 160 rides off the protruding portion of the cam surface 156 and the lower jaw closes against the upper jaw with portions of the two reaches of twine caught side by side within the jaws, as shown in Fig. 4.

This brings the cycle immediately subsequent to the position of Fig. 1. Fig. 1 shows the lower jaw of the knotter beak still dropped. Immediately following that position, the roller 161 will drop to close the lower jaw 160 at the end of the complete revolution of the knotter head. The sliding plate 132 has been withdrawn after the first quarter of revolution of the knotter head. The tip-up lever 188 is still in elevated position, but its function is no longer required and it will be turned downwardly when the knotter beak is drawn rearwardly to its normal position.

The next step in the knotting operation is to pull that portion of the two reaches of twine which are grasped within the knotter beak, backwardly through the portions of twine which encircle the knotter beak externally, to form the characteristic loop of a twine knot. To do this the knotter beak is withdrawn backwardly while the twine, which encircles the beak externally, is held against going backwardly with the knotter beak, and hence the knotter beak is pulled out from the encircling twine as the beak pulls some of the twine through the encircling twine to form the loop of double twine.

This rearward withdrawal of the knotter beak is effected by rocking its bracketing member 148 about its pivotal mounting 149 on the main frame. The twine which externally encircles the knotter beak is precluded from backward movement along with the beak by a stripper 138 which engages the right side of the knotter beak to strip the encircling twine therefrom as the knotter beak moves backwardly. In my Patent No. 1,606,290 I show additionally an auxiliary stripper for the left side of the beak. It is not shown here because I find that with my present improvements the auxiliary stripper may safely be omitted in most installations.

The stripping means which engages the right-hand (Figs. 1, 2 and 3) side of the knotter beak comprises a generally horizontal stripper plate 138 carried beneath the table 84c and illustrated per se in Figs. 8 and 9. By means of a depending lateral flange it is pivoted about a transverse horizontal axis to the main frame of the machine. Its forward end is turned downwardly to form a lip 139, at the left-hand edge of which is a slot 140. The left-hand edge of the lip 139 is adapted to engage the right-hand face of the knotter beak as the knotter beak is moved rearwardly, thereby stripping the encircling twine from the beak. The slot 140 is of a size calculated to accommodate two side by side portions of twine. Specifically, these are the two portions of twine which emerge to the right from the interior of the jaw which is grasping the two side by side portions of twine which it has previously received. As the encircling twine is stripped from the beak, these two emerging portions of twine, which will ultimately form the loop of the knot, are progressively left lying along the right-hand side of the rearwardly moving beak. The purpose of the slot 140 is to accommodate these portions of twine so that the stripping lip 139 will not cut them.

The improvement which I have made by my present invention in the stripping plate 138 is the provision of a milled counterslot A28 in the forward face of the lip 139, so arranged that it forms an acute angle for the stripping edge A30 of the lip 139. This acute angled stripping edge A30 is better calculated to engage and strip the encircling twine from the knotter beak. Previously, with a right-angled stripping edge, there was more tendency for the stripping plate to ride over the encircling twine on occasion without properly stripping it. The acute angled stripping edge tends to wedge itself between the right-hand face of the knotter beak and the twine and preclude danger of the stripper riding over the twine and failing to strip it.

It will be understood that the stripper 138 is normally out of position so that it does not interfere with the rotation of the knotter head, but after the knotter head has completed its rotation it is brought into stripping position during the backward withdrawal of the knotter beak.

The adjacent ends of the two reaches of twine T6 and T4, being caught side by side in the twine catcher 123, are anchored during the tying operation. As previously stated, the parallel portions of twine, which are gasped in the jaws of the knotter beak, are pulled through the pair of encircling portions of twine which have been wrapped about the knotter beak. The other ends of the reaches of twine T4 and T6 are held by the package and by the concatenation T5. The length of twine which is pulled backwardly by the knotter beak to form the loop of the knot, comes from the length of the beak-encircling twine. In other words, the side by side knot loops which are pulled out by the knotter beak are formed, for the most part, of twine which was originally in the encircling portions of twine which become of progressively less circumference as the encircling twine is stripped toward the tapered or pointed end of the beak as the knotter head is drawn backwardly.

I shall describe the completion of the knotting operation and then revert to a discussion of an improvement I have made in the knotter beak.

As the encircling twine is stripped off the point of the beak and the knot loops are formed by the backward movement of the knotter beak, a cutter carrier 178, which is pivotally mounted on a suitable bracket carried by the main frame, is swung outwardly and downwardly so that its groove or notch 185 engages the initial reach of twine T4 and moves it downwardly so that it will not be cut by the cutter blade 183 borne by the carrier 178. The cutter blade 183, however, will cut the reach of twine T6 a short distance to the right of its anchorage on the twine catcher 123. That leaves the twine extending from the end of the wrapping arm to the twine catcher but severed shortly therebeyond, so that that portion of the twine is ready for the next cycle of operation. The continued downward swinging of the cutter carrier notch or groove 185 pulls the original reach of twine T4 loose from its anchorage on the twine catcher 123 against its frictional retention thereby. This frees the knot entirely from anchorage on the machine, and the wrapped and tied package P may then be removed, leaving the machine free for the next cycle of operation upon another package.

Having now completed a description of a complete cycle of operation and the pertinent structure involved, I shall return to a description of the improvements I have made by the present invention in the knotter head. One improvement consists in shifting the crown A31 of the knotter head to the rearward side of the axis of the knotter shaft 157, as best shown in Fig. 4. With the crown or highest point on the knotter head placed at the side of the axis opposite from the point of the beak, I am better assured that the pair of beak encircling portions of twine will be urged toward the point of the beak when they are tightened. Previously the crown of the head has been on the side of the axis toward the beak and on occasion the encircling twine has lodged in the region of the axis and behind the crown and has not progressed properly toward the point of the beak, because in doing so it would have to ride up over the crown.

Another improvement in the knotter head consists in the conformation of that portion of the beak which receives the side by side portions of twine which are to be pulled through the encircling twine to form the knot loops. Still referring to Fig. 4, the underside of the upper jaw 159 is flat and horizontal. The top face of the lower jaw 160 is cut out to provide a shoulder A32 and a horizontal ledge A33 parallel with the under face of the upper jaw 159 and spaced therefrom by a distance slightly less than the minimum diameter of twine which will be employed and extending rearwardly (to the left, Fig. 4) from the shoulder A32. The ledge A33 extends horizontally and parallel with the underface of the upper jaw 159 for a distance rearwardly of the shoulder A32, which distance is a little more than two twine diameters. Rearwardly of that the ledge is inclined as shown at A34. The free end of a leaf spring 162 engages the roller 161 on the depending arm of the lower jaw 160 yieldingly to close the lower jaw against the upper jaw. When the jaws are opened, as previously explained, in the course of a revolution of the knotter head, the two side by side portions of twine are received therein near the bight of the open jaw, so that when the lower jaw 160 is again closed the portions of twine engaged by the jaw lie close to the bight and against the encircling twine, as shown in Fig. 4. However, the inclined face A34 of the jaw 160 affords sufficient clearance at that region so that the portions of twine engaged within the jaw may readily move outwardly toward the ledge A33. This enables the encircling twine, at the start of the stripping motion of the knotter head, to come somewhat closer to the point of the knotter beak and thereby better insure that the strippers will engage behind, rather than at the region of, the encircling twine. As the encircling twine is subsequently held by the strippers and the knotter beak is withdrawn therefrom, the pull on the twine portions which are engaged within the jaw will pull them into the region of the ledge A33 in side by side relation and against the shoulder A32. This conformation of the mating surfaces of the upper and lower jaws 159 and 160 better adapts the knotter head to different sizes of twine.

Another feature of my present invention is concerned with the mounting of the twine catcher 123 on its block 120 and the conformation of the cooperating juxtaposed surfaces of the button of the twine catcher and of the block 120.

The button of the twine catcher 123 is beveled or frusto-conical at its peripheral edge A35. The inner face A36 of the button of the twine catcher forms a but slightly rounded corner with the tapered edge A35. The stem 121 is received within an inner bearing A37 and an outer bearing A38. The inner bearing A37 fits the stem reasonably closely, but the outer bearing A38 is quite loose to permit considerable oscillation of the stem. A spring 122, interposed between the rear face of the block 120 and a lock nut on the stem, urges the inner face A36 of the twine catcher button against the front face A39 of the block.

The conformation of the face A39 is one of the features of my present invention. The face A39 is somewhat spiral so that it represents approximately a convolution of a helix with a small axial advance. This helix starts at an approximately radial shoulder A40 and extends counterclockwise (Fig. 10a) with a gradual outward (toward the reader) progression back to the shoulder A40. The height of the shoulder A40 is somewhat less than the minimum diameter of twine to be employed. As a result of this helical conformation of the face A39, it appears in the plan view of Fig. 10b to be inclined. The corner of the block opposite the shoulder A40 is generously rounded off and the two intermediate corners are rounded off to a lesser degree.

The shoulder A40 comes at the upper right-hand (Figs. 1, 2 and 3) corner of the block, that is, at the upper corner of the block toward the knotter head. The resulting somewhat oblique disposition of the face A39, as best shown in the drawing of Fig. 10b and the bottom view of Fig. 10d, tends to urge the stem 121 of the twine catcher toward the left-hand side of its bearing A37. The highest—or more properly the outermost—region of the face A39, as it is engaged by the button face A36, is toward the right of the stem, that is, toward the knotter. Consequently, twine caught by the twine catcher is engaged more tightly on the right side of the face A39.

This feature is of peculiar advantage. The original reach of twine T4, as well as the reach T6, are yieldingly held by the twine catcher. Under sufficient tension some additional length of twine can be, and generally is, pulled from the twine catcher. This additional pulling out may be from either or both of two causes. One is the tension of the two reaches T4 and T6 as they are carried to the right and beneath the knotter beak by the free end of the U-shaped projection 135 of the sliding plate 132. The other is the tension created by the revolution of the knotter beak to encircle itself by the two reaches of twine. Both of these tension actions result from the necessity of increased lengths of twine for the two reaches. The increased length may come from either or both of two sources. It may come from pulling some more twine through the twine catcher. Or, it may come from the twine wraps, by pulling them tighter. How much will come from the latter source—the wraps—depends on how soft or compressible the bundle or package is in relation to how tightly the twine is held by the twine catcher. The bundles or packages will vary in softness or compressibility. Sometimes the additional twine will come wholly from the wraps, sometimes wholly from the twine catcher, sometimes partly from each.

Thus the short tail T1 by which the reach T4 of twine is anchored to the twine catcher will be partially pulled through the twine catcher to a variable or unpredetermined extent. In some instances the anchoring tail T1 of the twine may be pulled so far that it is held only by its very end at the right-hand side of the twine catcher— the side from which it emerges. If the twine catcher held tighter on the left side than on the right side, the twine end would not be held sufficiently tightly during the knotting operation. But by my present invention the face A39 is so contoured, and the button 123 is so mounted, that the twine is held most tightly on the right side. Therefore, during the knotting operation, the reach T4 of twine is held adequately and with uniform tension no matter how short the anchoring tail T1 left in the twine catcher happens to be.

This makes the anchorage and release for the reach T4 of twine more positive and satisfactory and does not tend to dislodge the anchorage for the new reach of twine which extends between the twine catcher and free end of the wrapping arm 92.

The reach of twine T6 in extending from the twine catcher to the knotter head passes from the top side of the twine catcher and lies along the shoulder A40. The shoulder A40 thus serves as an abutment better to hold up the twine catcher end of the twine reach T6 so that it will be severed by the cutter and kept spaced sufficiently above the original reach of twine T4 so that it will not be engaged by the groove 185 along with the reach T4. The inclination of the face A39 is such as to discourage the button being tilted toward the free end of the extension 135 of the sliding plate 132, so that the free end thereof may come just above the button of the twine catcher in moving the twine under the knotter beak, but still avoid danger of the twine catcher button binding against the bottom face of the extension 135.

If the bearing for the stem did not permit any oscillation and the front face A39 of the block 120 were flat rather than somewhat helically conformed, the tension of the twine holder on the twine and its adaptability to different sizes of twine would depend solely on the axial outward movement of the stem 121 against the pressure of the spring 122. That would tend to cause self-camming action on the twine. By providing the front face of the block A39 with the contour as shown and providing for oscillation of the outer end of the stem 121, the tightening of the twine between the button and the face A39 tends to pull the stem 121, within its oversize bearing A39, to the right, that is, toward the twine catcher. As a result the twine catcher will hold different diameters of twine with a fairly uniform tension and without the necessity of adjusting the tension of the spring 122, by resetting the lock nuts, to adapt it to different diameters of twine.

I prefer to drill a vertical hole A41 through the block 120 to intersect the bearing A38. The purpose of the hole A41 is to provide an exit for those pieces of lint which come loose from the twine as the twine is pulled through the twine catcher and work themselves into the bearing A38. If these pieces of lint are permitted to accumulate in the bearing A38, they would eventually clog it and render the twine catcher unsatisfactory in operation.

While I have shown and described these specific embodiments of my present invention, I contemplate that changes and substitutions may be made thereover without departing from the scope or spirit of my invention.

Certain of the improvements disclosed herein—for example, the improved mounting of the twine catcher, the improved tip-up arm, and the improved draw slide—are the subject-matter of my application, Serial No. 281,197, filed June 26, 1939, which is a division hereof.

I claim:

1. A tying machine comprising in combination, a knotter having a beak for receiving a double wrap of twine thereabout and grasping an integral extension of the twine between the jaws to pull it through the beak-encircling twine to form a knot loop, the beak having two jaws mounted for relative articulation, and a stripper cooperating with the beak along one side thereof by relative motion of the stripper and beak longitudinally of the beak to strip the encircling twine therefrom, the stripper comprising a portion extending laterally toward the side of the beak and presenting an edge thereadjacent, a notch in the edge for receiving the side by side reaches of twine being pulled through the encircling twine, the face of the said portion of the stripper toward the point of the beak being disposed at an angle to the side of the beak whereby the stripping edge presents an acute angle corner.

2. A tying machine comprising in combination, a knotter having a beak for receiving a double wrap of twine thereabout and grasping an integral extension of the twine between the jaws to pull it through the beak-encircling twine to form a knot loop, the beak having two jaws mounted for relative articulation, and a stripper cooperating with the beak along one side thereof by relative motion of the stripper and beak longitudinally of the beak to strip the encircling twine therefrom, the stripper comprising a portion disposed substantially in a plane at a normal to the axis of the stripper and having a stripping edge lying adjacent the side of the beak, and a slot in the face of the said portion toward the point of the beak for conforming the face corner of the stripping edge to an acute angle corner for the purpose described.

3. A tying machine comprising a knotter having a beak for receiving parallel reaches of twine encircling the beak in a plane transverse thereof, the beak comprising jaws for receiving integral extensions of the encircling twine to pull the extensions through the encircling twine to form knot loops, and a stripper mounted to ride along one side of the beak to strip the encircling twine therefrom, the stripper having a stripping edge forming an acute angle.

4. A tying machine comprising a knotter having a beak for receiving parallel reaches of twine encircling the beak in a plane transverse thereof, the beak comprising jaws for receiving integral extensions of the encircling twine to pull the extensions through the encircling twine to form knot loops, and a stripper mounted to ride along one side of the beak to strip the encircling twine therefrom, the stripper having a stripping edge forming an acute angle, and a notch in the stripping edge for receiving the loop-forming reaches of twine at the side of the beak.

5. A tying machine comprising a knotter having a beak for receiving parallel reaches of twine encircling the beak in a transverse plane, the beak having a pair of jaws for receiving integral extensions of the encircling twine to draw them through the encircling twine to form knot loops, one of the jaws being articulably mounted upon the other, one of the jaw faces being flat and the cooperating jaw face having a portion adjacent the point adapted to close upon the first face, a shoulder at the end of said portion, a ledge extending rearwardly of the shoulder parallel with and a spaced distance from the first face, and continuing into an inclined portion extending rearwardly of the beak point and away from the first face.

6. A tying machine comprising a knotter having a beak for receiving parallel reaches of twine encircling the beak in a transverse plane, the beak having a pair of jaws for receiving integral extensions of the encircling twine to draw them through the encircling twine to form knot loops, one of the jaws being articulably mounted upon the other, the first jaw face being flat and the cooperating jaw face having a first portion adjacent the point of the beak for closing flush against the first face, a second portion rearwardly thereof and spaced therefrom by a distance slightly less than the diameter of the twine, and forming a shoulder at the junction of the first and second portions, and a third portion extending rearwardly from the second portion and inclined away from the first face.

7. A tying machine comprising a knotter having a beak for receiving parallel reaches of twine encircling the beak in a transverse plane, the beak having a pair of jaws, one of which is articulably mounted upon the other with their cooperating faces receiving extensions of the encircling twine to draw them through the encircling twine to form knot loops, the first jaw face being flat and the cooperating jaw face having a first portion adjacent the point of the beak for closing flush against the first face, a second portion rearwardly thereof and spaced therefrom by a distance slightly less than the diameter of the twine, and forming a shoulder at the junction of the first and second portions, and a third portion extending rearwardly from the second portion and inclined away from the first face, the length of the second portion being in the order of twice the diameter of the twine.

8. A tying machine comprising a knotter having a beak for receiving parallel reaches of twine encircling the beak in a transverse plane, the beak having a pair of jaws, one of which is articulably mounted upon the other with their cooperating faces receiving extensions of the encircling twine to draw them through the encircling twine to form knot loops, the cooperating jaw faces being so conformed relative to each other as to provide a portion adjacent the beak point where the faces may come together, a second portion rearwardly of the first portion and separated therefrom by a shoulder, the faces being spaced apart at the second portion by a space slightly less than the diameter of the twine, the second portion being of a length in the order of twice the diameter of the twine, and a third portion of wedge shape extending rearwardly from the second portion and of increasing space toward the bight of the jaws.

9. A tying machine comprising a knotter having a beak for receiving parallel reaches of twine encircling the beak in a transverse plane, the beak having a pair of jaws, one of which is articulably mounted upon the other with their cooperating faces receiving extensions of the encircling twine to draw them through the encircling twine to form knot loops, the cooperating jaw faces being so conformed relative to each other as to provide a portion adjacent the beak point where the faces may come together, a second portion rearwardly of the first portion and separated therefrom by a shoulder, the faces being spaced apart at the second portion by a space slightly less than the diameter of the twine, and a third portion of wedge shape extending rearwardly from the second portion and of increasing space toward the bight of the jaws.

10. A tying machine comprising a knotter head having a beak extending therefrom for receiving parallel reaches of twine encircling the beak, a bearing for journaling the head for rotation about an axis substantially at right angles to the beak and spaced rearwardly from the point of the beak, the beak comprising cooperating jaws adapted to receive continuations of the encircling reaches for pulling them through the encircling reaches to form knot loops, and a stripper for relative movement along the beak toward the point thereof for stripping the encircling twine from the beak, the end of the beak remote from its point having a crown portion with the high point of the crown on the side of the axis opposite the point of the beak.

11. A tying machine comprising a knotter head, means for journaling the knotter head for rotation, a beak extending from the knotter head substantially at right angles to the axis of rotation for receiving side by side reaches of twine encircling the beak as the head is rotated about the axis, the beak comprising cooperating jaws for receiving extensions of the encircling twine for pulling the extensions through the encircling twine to form the knot loops, the top of the upper of the jaws having a surface of increasing height from the point to a crown, the high point of which crown is on the side of the axis opposite the point, whereby the encircling twine under tension tends to move toward the point.

BENJAMIN H. BUNN.